United States Patent [19]

Gamilis et al.

[11] Patent Number: 5,544,786
[45] Date of Patent: Aug. 13, 1996

[54] VOLUME AND FLOW MEASURING APPARATUS

[75] Inventors: James Gamilis, North Carlton; Emmanuel A. Gamilis, East Brighton, both of Australia

[73] Assignee: Technichem Pty. Ltd., Australia

[21] Appl. No.: 859,476

[22] PCT Filed: Oct. 17, 1990

[86] PCT No.: PCT/AU90/00496

§ 371 Date: Jun. 15, 1992

§ 102(e) Date: Jun. 15, 1992

[87] PCT Pub. No.: WO91/05986

PCT Pub. Date: May 2, 1991

[30] Foreign Application Priority Data

Oct. 17, 1989 [AU] Australia ............... PJ6923

[51] Int. Cl.⁶ ...................................... B67D 5/08
[52] U.S. Cl. ............................... 222/59; 222/71
[58] Field of Search ................. 222/59, 71, 478, 222/481.5, 640, 504, 52, 55; 73/861.74, 304

[56] References Cited

U.S. PATENT DOCUMENTS

| | | | |
|---|---|---|---|
| 4,059,181 | 11/1977 | Greenfield, Jr. et al. | 222/640 X |
| 4,288,007 | 9/1981 | Rogers et al. | 222/481.5 X |
| 4,487,333 | 12/1984 | Pounder et al. | 222/71 X |
| 4,599,907 | 7/1986 | Kraus et al. | |
| 4,858,172 | 8/1989 | Stern | 222/52 X |
| 4,930,666 | 6/1990 | Rudick | 222/181 |
| 4,931,776 | 6/1990 | Klos et al. | 73/861.74 X |
| 4,955,507 | 9/1990 | Kirschner et al. | 222/71 X |

FOREIGN PATENT DOCUMENTS

| | | |
|---|---|---|
| 273344 | 10/1965 | Australia . |
| 66889 | 12/1986 | Australia . |
| 20282 | 4/1989 | Australia . |
| 239703 | 10/1987 | European Pat. Off. . |
| 1119969 | 6/1956 | France . |
| 2802830 | 7/1979 | Germany . |
| 2929528 | 2/1981 | Germany . |
| 1580662 | 7/1977 | United Kingdom . |
| 1519953 | 8/1978 | United Kingdom . |
| 2211484 | 7/1989 | United Kingdom . |

*Primary Examiner*—Andres Kashnikow
*Assistant Examiner*—Lisa Douglas
*Attorney, Agent, or Firm*—Andrus, Sceales, Starke & Sawall

[57] ABSTRACT

Apparatus for dispensing liquids includes a body in which the liquid is initially located. A one-way valve and an outlet are located on the body in reasonable proximity to each other, the outlet communicating with a conduit able to be closed by a control valve. When the body is located such that the one-way valve and the outlet are below the surface of the liquid, gravity ensures constant liquid flow through the conduit when the control valve is opened, and when air begins to pass through the one-way valve. A flow rate change measuring instrument has two metallic strips, one of which is able to move in relation to the other strip in response to flow changes, the capacitance between the strips being processed to obtain a measurement of flow rate change. The measuring apparatus may be located in the conduit of the dispensing apparatus.

2 Claims, 4 Drawing Sheets

VOLUME AND FLOW MEASURING APPARATUS

This invention relates to apparatus for measuring the volume of a liquid administered from a valve, or the rate of flow of a liquid at some point within an apparatus.

It is a characteristic of liquids such as water to remain free flowing at all temperatures and under a wide range of applied forces causing the flow. Other liquids such as common household detergents are relatively free flowing when warm but become viscous as their temperature falls. At a particular temperature, however, many viscous liquids do not experience a significant viscosity change.

For other viscous liquids, for example, engine lubricating oil, the viscosity not only changes according to the temperature but will also change at a particular temperature depending on such factors as the liquid's flow and temperature history.

Still other liquids display a viscosity that is dependent on the force applied to move the liquid. An example of this kind of liquid is house paint which moves under the influence of the brush but resists further flow once applied. Chutney is also known for this behavior. Liquids such as lubricating oils are sometimes described as being visco-elastic whilst household paint is described as being a non-Newtonian liquid. By contrast, water is classified as a Newtonian liquid because its viscosity does not alter under a varying applied pressure.

For applications such as dispensing liquids, it is clearly desirable to be able to measure liquid flow parameters to enable accurate metering to be carried out.

In GB-A-1 580 662 there is disclosed a fluid flow control apparatus, which operates to ensure a constant volume flow in mixed hot and cold fluids. The apparatus includes a movable flow sensing means extending into a conduit through which the mixed fluid flows, the movement of the flow sensing means being coupled to an upstream damper, and a temperature sensor downstream of the flow sensing means, the sensor being adapted to vary the bias force on the flow sensing member.

The arrangement of GB-A 1 580 662 is relatively crude, as it makes no reference to the effect of the fluid flow on the movable flow sensing means by a direct component of force and by shear forces acting on the surface of the flow sensing means.

It is an object of this invention to provide apparatus for measuring the flow rate of a given liquid, whether the liquid is non-viscous, or highly viscous.

It is also an object of the invention to provide a means of continuously monitoring the flow pattern of complex liquids whose flow properties change both with temperature and flow conditions, in order to characterize certain aspects of the rheology of the liquid.

The invention provides apparatus for producing a constant flow, including a body adapted to contain a liquid, a one-way valve adapted to allow gas flow into said body, and a liquid outlet from said body, said one-way valve and said outlet being located in reasonable proximity to each other, said outlet being connected to a conduit, the flow through which is controlled by a valve, the apparatus operating such that when said one-way valve and said outlet are at a level lower than the level of liquid in said body, a constant flow of liquid will be achieved in said conduit when said valve is opened and when gas commences to enter said body through said one-way valve.

The invention also provides a liquid flow measurement instrument, including two members, a first one of which is able to move with respect to a second one of which in response to fluid flow parameter changes, the capacitance between said members representing said parameter changes.

The invention further provides apparatus for measuring fluid flow parameters for control of fluid flow, including a body adapted to contain a liquid, a one-way valve adapted to allow gas flow into said body and liquid outlet from said body, said one-way valve and said outlet being located in reasonable proximate to each other, said outlet being connected to a conduit, the flow through which is controlled by a valve, there being located in said conduit one or more instruments for measuring fluid flow parameters said or each instrument including two members, a first one of which is able to move with respect to a second one of which in response to fluid flow parameter changes in said conduit, the capacitance between said members representing said parameter changes, said capacitance being processed, or the capacitance from each instrument being processed to enable said valve to be controlled to produce a constant liquid flow downstream of said valve.

The invention also provides a method for measuring liquid flow and/or dispensing liquid at a constant rate, including the steps of;

producing a generally constant liquid flow rate in a conduit by attaching it to an outlet of a liquid-containing body, said body having a one-way valve for ingress of gas in reasonable proximity to said outlet, and orientating said body such that said one-way valve and said outlet are below the surface of said liquid in said body, measuring liquid flow parameters in said conduit, the results of said measurement being used to control a valve in said conduit, thereby ensuring constant liquid flow.

Embodiments of the invention will be described in detail hereinafter, with reference to the accompanying drawings, in which.

Figure 1:
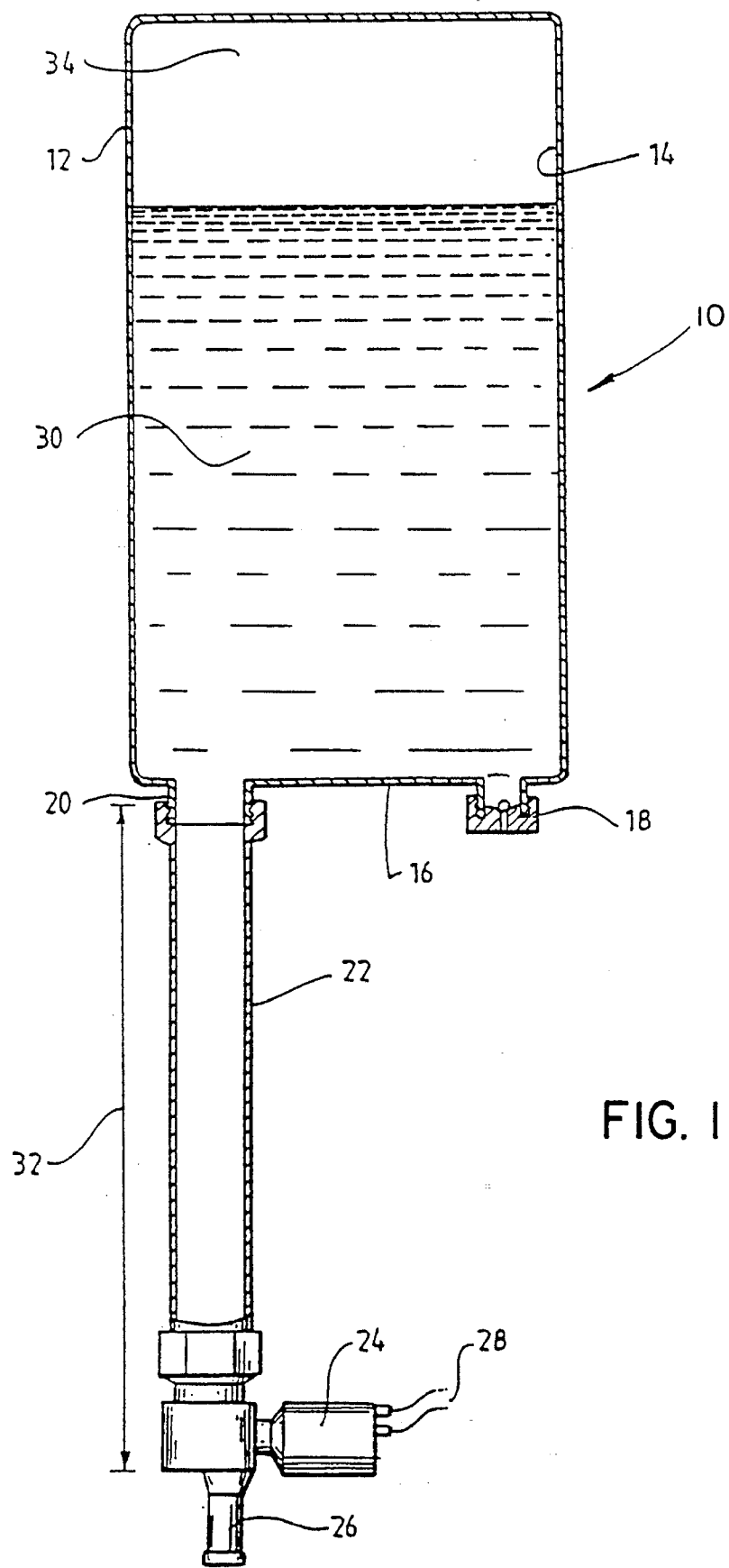
FIG. 1 is a section through one embodiment of apparatus in accordance with the present invention.

Referring firstly to FIG. 1, the apparatus 10 includes a main container body 12, with an interior volume 14. The body 12 may be of any suitable shape, such as a cylinder or a cuboid, and may be formed of any suitable material.

At the same end 16 of body 12, that is, in reasonable proximity to each other, are a one-way valve 18 and an outlet 20.

The one-way valve 18 may be a ball valve, as illustrated, or a diaphragm, needle or other valve, or may simply be a small aperture.

Connected to outlet 20 is an exterior pipe or conduit 22 leading to an on/off valve 24. Valve 24 acts to regulate flow through a tap 26, or through an alternative component.

Valve 24 is preferably a solenoid valve, operated through wiring 28 by control means (not shown) which preferably includes a timer. The valve 24 may be mechanically, pneumatically or hydraulically operated. Container body 12 contains, in use, liquid 30. Reference numeral 32 refers to height difference between valves 18 and 24.

The apparatus 10 operates as follows.

The container body 12 containing liquid 30 is upended into the position shown in FIG. 1 so that the space directly above valve 18 and outlet 20 is occupied by liquid 30. Above the liquid level is a space 34 defined by the sealed container body 12 and the liquid 30.

When container body 12 is upended liquid 30 flows into pipe 22 until all air or gas in pipe 22 is expelled and replaced by liquid 30.

When on/off valve 24 is opened liquid 30 flows out of apparatus 10 via tap 26. The establishment of equilibrium in apparatus 10 to "steady-state" conditions is coincident with air or gas beginning to bubble into the liquid via the one-way valve 18. At this moment the flow rate of the liquid 30 becomes constant.

It should be noted that constant flow is established using gravity, and not using pumps. Further, it is preferable to operate the system under atmospheric pressure, with air entering the body 12 through valve 18, although other gases and/or pressurization may alternatively be used. It should be noted that flow remains constant only as long as the liquid maintains a constant viscosity. However, apparatus 10 is designed primarily to ensure constancy of pressure at any particular point within conduit 22.

Once the constant flow rate has been obtained—subject to variation in parameters, to be discussed hereinafter—it is then possible to dispense accurate volumes of fluid by opening valve 24 for a predetermined time, this time being governed by a timer located in the valve control means (not shown).

Factors important in fixing/establishing maximum flow rate and constancy of flow rate for any particular system (including the liquid) are:

a) type of one-way valve (18)

b) diameter of one-way valve (18)

c) diameter of on/off valve (24)

d) diameter of conduit (22)

e) density of one-way valve (18) stopper relative to specific gravity of liquid (30)

f) height difference (32) between one-way valve (18) and on/off valve (24)

g) pressure above liquid level at equilibrium

The method works at ordinary atmospheric pressure or with higher pressures developed by introducing pressurized gas into the sealed container via the one-way valve.

In addition the viscosity of the liquid must be taken into consideration. As viscosity may be temperature-dependent, it may be necessary to include a correction factor in the control means to vary the valve 24 on time to adjust for temperature and hence viscosity changes.

A correction factor can be generated by incorporating a temperature dependent voltage device, for example, a thermistor (not shown) into conduit (22) near valve (24) which monitors temperature of liquid (30) continuously. Variations in temperature causing changes in the voltage response of the thermistor are transmitted to a microprocessor M which translates the incoming voltage signal from the thermistor to an appropriate time variation to offset liquid flow changes due to viscosity changes in the liquid.

For certain liquids a clear relationship between viscosity and temperature cannot be easily established. The rate of change of temperature and the direction of change, can in some instances, result in a different viscosity at a particular temperature depending on the temperature history of the liquid. In such cases temperature monitoring for flow rate compensation is not appropriate.

Figure 3:
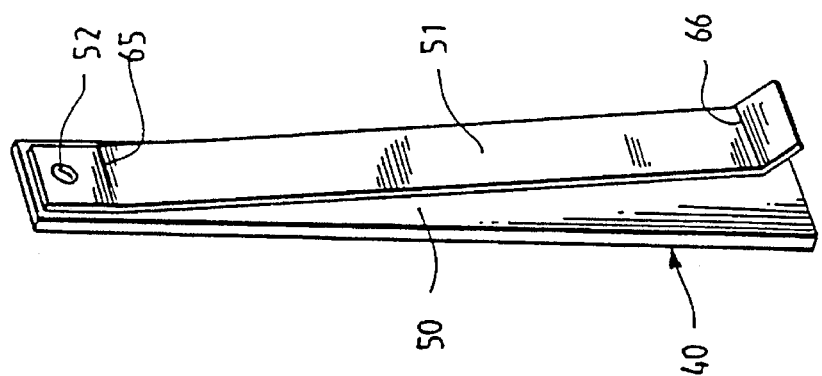
FIG. 3 is a perspective view of the instrument of FIG. 2.
Figure 2:
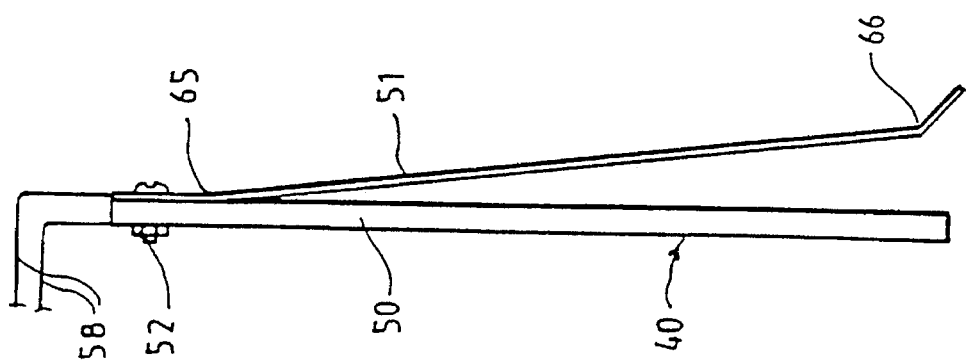
FIG. 2 is a side elevation of a first flow rate detecting instrument.

A low cost, reliable and accurate instrument for detecting flow rate changes within apparatus 10 is shown in FIGS. 2 and 3.

Apparatus 40 consists of two metallic strips 50 and 51 connected at one end by a bolt 52 or rivet, or the like. Although in physical contact by means of the bolt, metallic strips 50 and 51 are electrically isolated one from the other and both are electrically isolated from the bolt 52.

Metallic strip 50 is straight and supports metallic strip 51 by the bolt. Metallic strip 51 preferably operates as a spring and bends away from strip 50 at reference point 65, just below bolt 52, and also at reference point 66. Each strip is electrically connected to wire constituting the wire pair 58.

Figure 6:
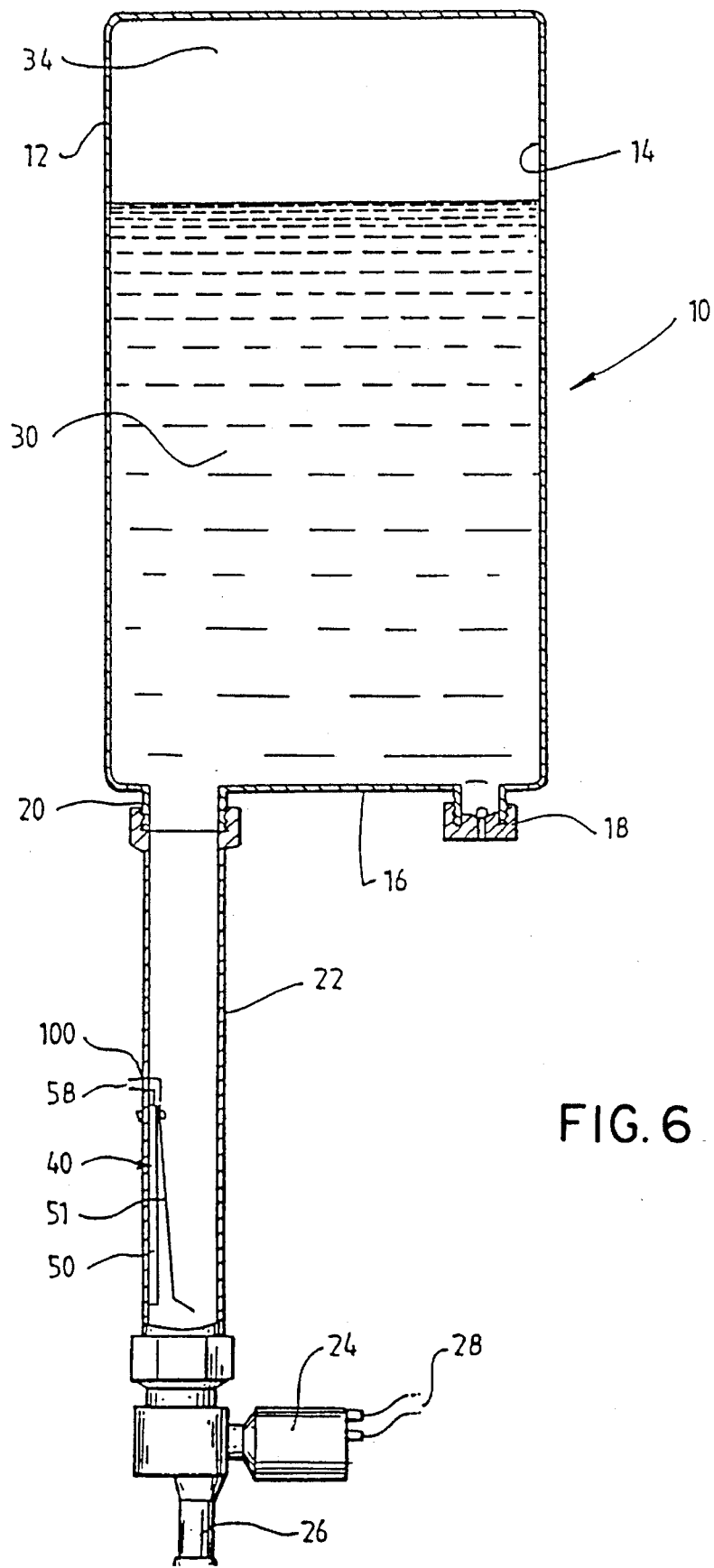
FIG. 6 is a section through a second embodiment of apparatus in accordance with the invention.

With reference also to FIG. 6, apparatus 40 is mounted as a single assembly in conduit 22 of apparatus 10 by fixing metallic strip 50 against the wall of conduit 22 so that the length of apparatus 40 extends vertically down to just above the intake point of on/off valve 24. Apparatus 40 may be aligned in conduit 22 in either direction with the bolt 52 uppermost or lowermost depending on the circumstances of measurement required.

The wire connection pair 58 is passed through a hole 100 in conduit 22 and is electrically connected to an oscillator circuit (not shown) which becomes part of the control mechanism for valve 24.

Apparatus 40 is effectively a capacitor whose capacitance varies according to the separation between the metallic strips 50 and 51. The oscillator circuit, to which apparatus 40 is connected, is capable of measuring continuously the spacing or separation between strips 50 and 51 by measuring the capacitance.

When conduit 22 is filled with liquid, apparatus 40 detects the separation between metallic strips 50 and 51 and transmits this information to the microprocessor controlling timer signals to valve 24. As soon as valve 24 is opened, metallic strip 51 is deflected toward strip 50 by the force of action of the liquid flowing through the conduit. The deflection so caused is detected by the oscillator as a change in capacitance by virtue of the change in separation between the two strips. This signal is transmitted from the oscillator to the control means governing the timer.

On closing of valve 24 liquid ceases to flow, and metallic strip 51, which is of spring metal material, resumes its original position before the flow occurred.

Because the extent of deflection is proportional to the rate of flow of liquid passing through conduit 22, the separation information provided to the controlling microprocessor M by apparatus 40 can be used as a compensation factor. This means that temperature information concerning liquid 30 is unnecessary as a means of compensating for viscosity changes that occur.

Thus the combination of factors contributed by apparatus 10—the ability to sustain liquid at a particular point in conduit 22 always constant in terms of pressure—and flow factors contributed by apparatus 40, enable accurate volumes to be dispensed for some liquids whose viscosities are not easily predictable from temperature alone.

The principle behind apparatus 40 can be extended to provide adequate compensation factors for the flow of liquids of complex rheology.

An extension of apparatus 40 is required in the case of developing compensation factors for visco-elastic and non-Newtonian fluids whose viscosities change due to changes in temperature and mechanical stress.

Figure 5:
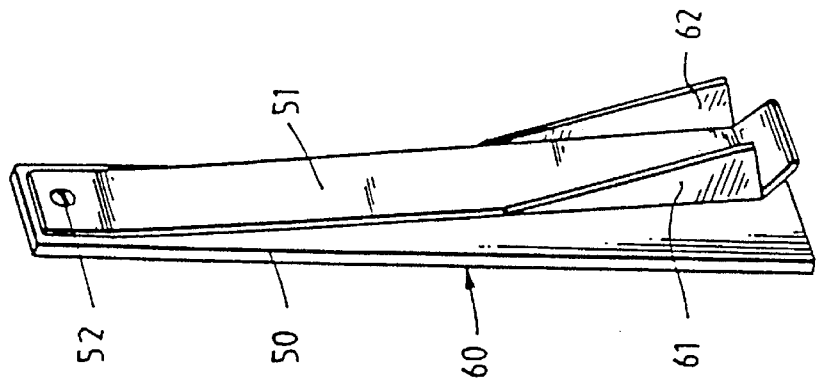
FIG. 5 is a perspective view of the instrument of FIG. 4.
Figure 4:
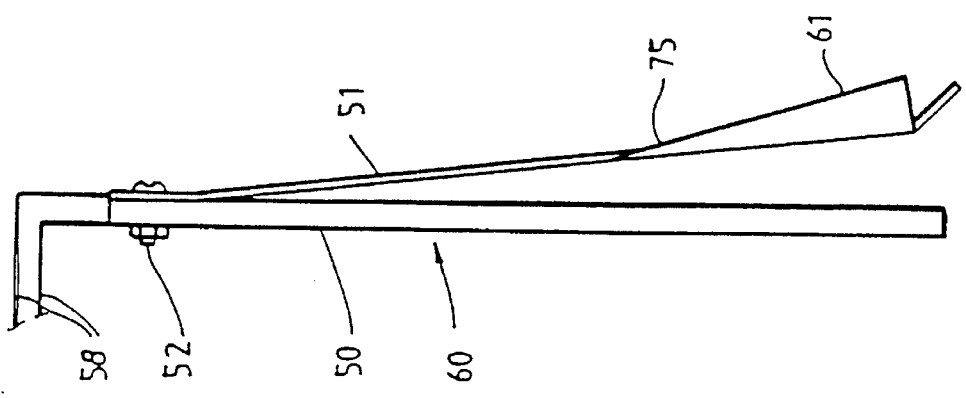
FIG. 4 is a side elevation of a second flow rate detecting instrument.

FIGS. 4 and 5 show a second metallic strip pair apparatus 60, which may be regarded as an extension of apparatus 40.

Apparatus 60 is generally similar to apparatus 40, but strip 51 is fitted with fins 61, 62 mounted parallel to the line of fluid flow.

Apparatus 60 is intended to operate such that strip 51, with fins 61, 62 is affected by both a component of force resulting from the liquid flow and the shear force acting on the strip surfaces.

Figure 7:
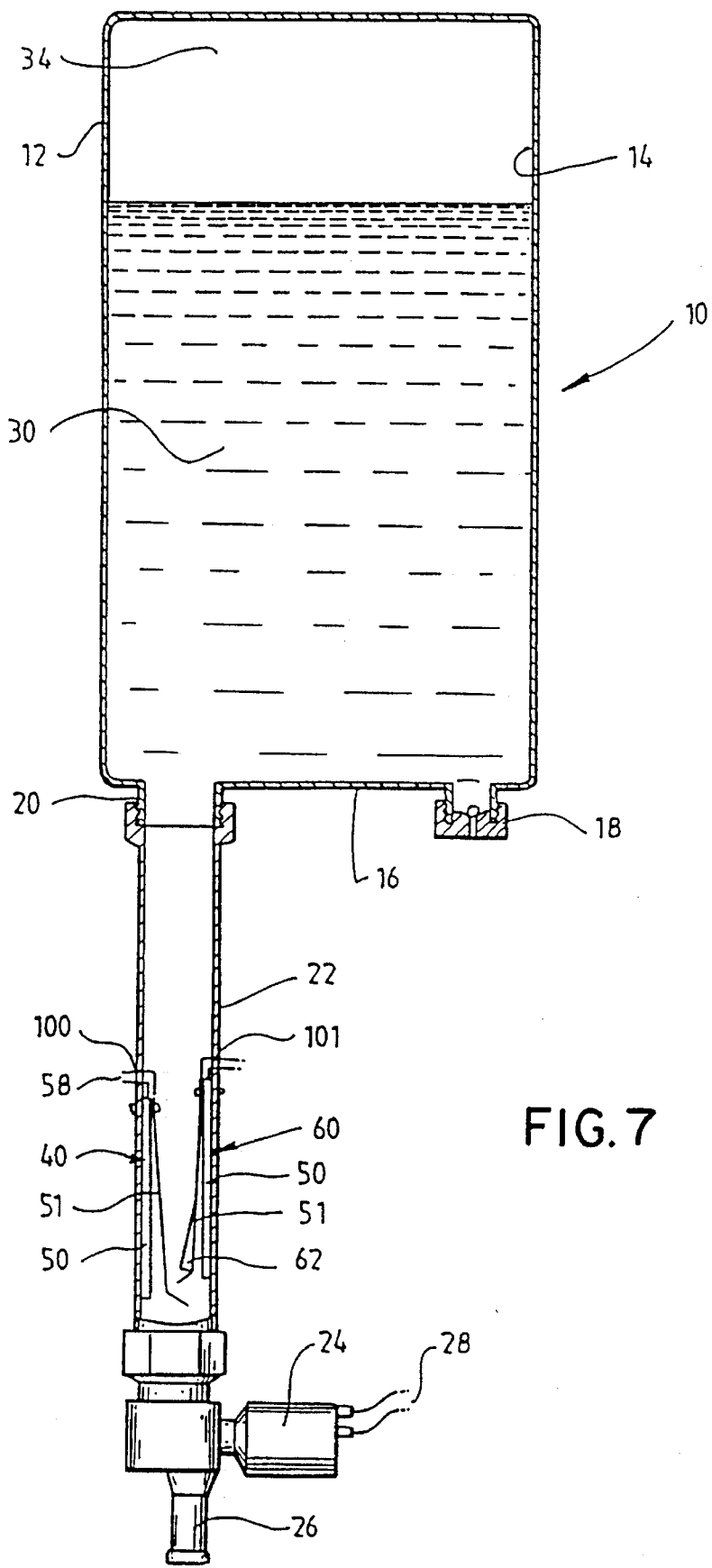
FIG. 7 is a section through a third embodiment of apparatus in accordance with the invention.

FIG. 7 shows an arrangement to obtain information necessary to derive accurate compensation factors for viscoelastic and non-Newtonian fluids. Apparatus 60 is mounted in conduit 22 of apparatus 10 opposite apparatus 40 and has a wire connector pair 58 passed through a hole 101 in conduit 22. When liquid flows through conduit 22 both spring strips are deflected by the force of action of the flow but the degree of deflection differs depending on the viscosity of the fluid.

The microprocessor M now reads two incoming signals, one from each of apparatus 40 and apparatus 60, continuously. These signals provide meaningful data needed to calculate flow rate and hence regulate timer means to obtain volume required or determine volume dispensed from available flow time.

It can be appreciated that the capacitance devices described are useful in the context of apparatus 10 which provides a constant pressure condition at any particular point in conduit 22.

To apply apparatus 40 and 60 in non-pressure regulated systems for determination of flow rate of liquids it is necessary to monitor pressure and capacitance per apparatus 40/60 simultaneously.

Thus, the flow rate determination in a non-pressure regulated stream of Newtonian fluid which does not vary in viscosity with temperature, apparatus 40 in conjunction with pressure information from, for example, a pressure transducer P, is sufficient data to generate accurate compensation factors. To determine flow rate in a non-pressure regulated stream of a non-Newtonian liquid, apparatus 40 and apparatus 60 must be operated simultaneously and together with a pressure transducer P. All three signals are data processed to determine flow rate and volume.

One benefit of apparatus 40 and apparatus 60 is that in applying these devices to flow measurement of chemically aggressive media, the metallic plates may be physically protected from the media, and vice-versa, by suitable coatings, for example polytetrafluoroethylene or a plastic material, without impairing signal quality.

It is a further benefit of apparatus 40 and 60 that the signal generated when the apparatus is at rest is very stable. This signal depends on the separation between the plates and on the dielectric properties of the liquid in which the apparatus is immersed. When at rest the separation between metallic strips is always constant. In the event of a change in the liquid occurring in respect of the liquid's chemistry or physical state, the dielectric of the liquid will change and this change constitutes a means of establishing the stability of the liquid itself. Apparatus 40 thus provides a secondary benefit in monitoring the condition of the liquid in which the apparatus is located.

For example, if apparatus 40 is used to monitor the flow rate of an emulsion, for example milk, the separation of the milk into its components, water and milk fat, will result in a dielectric change. This change can provide the basis for a warning or prevent the dispensing apparatus from operating until checks have been conducted.

Apparatus 40 and 60 can be replaced by similar devices which rely on deflection to monitor flow. Strain gauges can be used to gauge the deflection in which case non-metallic strips or wires could be used.

The information generated by apparatus 40 and 60 either located in a pressure regulated system such as apparatus 10 or a non-pressure regulated system can be used as the basis for characterizing the rheology of liquids.

The invention described is useful in the design of dispensing equipment, volume measuring instruments and instruments which can characterize flow properties of liquids, that is, analyze fluid rheology.

It can be seen that the invention provides an apparatus that will measure accurately the flow rate of any of the liquid types previously described for the purpose of measuring a volume of said liquid, or to determine the flow rate of the liquid at a particular point in the apparatus, and to characterize the liquid in respect of the liquid's rheology.

We claim:

1. An apparatus for dispensing a metered volume of liquid comprising:

a liquid container body for containing liquid in a lower portion thereof;

a pressure responsive, one-way valve extending through said container body so as to be responsive to pressure within said container body and so as to be responsive to the pressure of a gas applied to the valve exterior of said container body, said valve allowing gas flow into said container body when the gas pressure exterior of said container body exceeds the internal pressure in the container;

a liquid outlet from said container body, said one-way valve and said outlet being located at the same level of said container body and at a level lower than the level of liquid in said container body;

a conduit connected to said outlet and through which the liquid flows at the constant pressure;

a flow valve for controlling the flow of liquid through the conduit, said flow valve being open for a predetermined time to deliver a measured volume of liquid;

a processing means connected to said flow valve; and a measurement instrument in said conduit for measuring the flow parameters of liquid flowing through said conduit, having a first capacitance device connected to said processing means, said first capacitance device having a deflectable strip member attached to and in electrical isolation from a reference strip member, and a second capacitance device connected to said processing means, said second capacitance device comprising a second strip member attached to and in electrical isolation from a second reference member, the end of said second strip member distal from the attachment of said second reference member being provided with lateral fins which protrude into the flow path of the liquid in said conduit and are aligned parallel to the flow of liquid, the capacitance between said deflectable strip member and said reference member of said first capacitance device and the capacitance between said second strip member and said second reference member of said second capacitance device providing information to said processing means on the flow parameters of the liquid, said parameters being used by said processing means to determine the open time of said flow valve.

2. The apparatus of claim 1, wherein said flow valve is a solenoid valve.

* * * * *